United States Patent [19]

Reynolds

[11] 4,197,477
[45] Apr. 8, 1980

[54] ARMATURE LAMINA FOR A DYNAMOELECTRIC MACHINE

[75] Inventor: Kenneth R. Reynolds, Northeast, Pa.

[73] Assignee: General Electric Company, Schenectady, N.Y.

[21] Appl. No.: 924,000

[22] Filed: Jul. 12, 1978

[51] Int. Cl.² ............................................. H02K 1/22
[52] U.S. Cl. ..................................... 310/264; 310/216
[58] Field of Search ................. 310/210, 216, 217, 42, 310/261, 262, 264, 267, 49, 212, 183, 166, 218; 336/135, 217, 213, 234

[56] References Cited

U.S. PATENT DOCUMENTS

| | | | |
|---|---|---|---|
| 2,830,209 | 4/1958 | Fleckenstein | 310/216 |
| 2,907,904 | 10/1959 | Carpenter | 310/166 |
| 2,993,136 | 7/1961 | Richer | 310/216 |
| 3,207,935 | 9/1965 | Mosovsky | 310/216 |
| 3,235,762 | 2/1966 | Brammerlo | 310/216 |
| 3,375,385 | 3/1968 | Young | 310/261 |
| 3,870,912 | 3/1975 | Kipke | 310/183 |

Primary Examiner—R. Skudy
Attorney, Agent, or Firm—Vale P. Myles

[57] ABSTRACT

An armature lamina for a dynamoelectric machine characterized by having a plurality of equally spaced winding slots formed around its periphery so that the winding-receiving gap, or mouth, of each slot is positioned near one side thereof, rather than being positioned at the center of the slot. In a preferred embodiment, the winding slots are divided into groups such that half of the slots have their respective mouths positioned adjacent the leading slot side while the remaining half of the slots have their respective mouths positioned adjacent the trailing slot side. This characteristic off-centered arrangement of the respective slot openings enables a maximum number of energizing windings to be positioned in each slot when the laminae are stacked on a spindle and wound with coils of insulated magnet wire to form a random wound armature. Alternative embodiments are provided for short pitch and double fly wound machines.

16 Claims, 5 Drawing Figures

_4,197,477_

ARMATURE LAMINA FOR A DYNAMOELECTRIC MACHINE

BACKGROUND OF THE INVENTION

The invention relates to armature laminae for a dynamoelectric machine and more particularly to a form of such laminae that is useful in constructing a random wound dynamoelectric machine armature in which a maximum number of turns of an energizing winding are to be positioned within the respective conductor slots of the armature.

It is common practice to form an armature for a random wound dynamoelectric machine by first stacking a selected number of pre-formed, soft iron laminae on a suitable spindle, then placing sets of energizing coils in respective pairs of winding slots formed in the peripheries of the laminae, and finally encapsulating the assembly with a coating of insulating resin. Heretofore, in the manufacture of such armatures the usual practice was to make each of the laminations substantially identical to one another and to form the respective winding-receiving slots in the laminae so that they would be substantially identical to one another. In such prior art armature constructions each of the winding slots typically was provided with a mouth, or winding-receiving opening, that was centered relative to the associated slot.

As energizing coils are successively wound in the slots of such known types of armature constructions, all of the turns in each coil are normally positioned to one side or the other of the armature spindle. This conventional winding procedure causes the turns of the first half of the coils wound on the armature to be positioned primarily within the lower radial halves of the respective winding slots. As the second half of the coils are positioned in the slots, they are also wound so that all of their turns are positioned on a given side of the armature axle. Due to the fact that these later-applied coils must lay over the initially applied coils in the radially extended portions thereof surrounding the armature axle, the respective turns of these later coils are necessarily disposed primarily in the radially outer halves of the respective winding slots.

When the individual turns of the last-applied coils are wound onto the armature, they build up on one side of the slots and over the earlier-applied turns until the mouths of the slots become blocked. Since it is then practically impossible to economically insert additional winding turns into the respective slots, particularly when an automatic winding machine is being utilized, the slots are not completely filled with copper. Specifically, the area of the respective slots located to that side of the centered mouth of each slot opposite the side of the slot on which the windings are initially applied, is not filled with winding turns. Due to this incomplete filling of each of the winding slots, the theoretical design efficiency of the armature is necessarily substantially less than it would be if each of the slots had been completely filled with turns of an energizing winding.

It is generally known in the prior art that conductor bars of induction motors can be partially secured in operating position within punched slots of rotor laminations by forming small projections on one side of such slots adjacent the top edge thereof. An example of the use of such projections to help hold induction motor conductor bars in position, against centrifugal forces produced by rotation of the rotor, is shown in U.S. Pat. No. 3,375,385, which issued on Mar. 26, 1968.

OBJECTS OF THE INVENTION

An object of the invention is to provide an armature lamina that overcomes the above-mentioned disadvantage of prior art laminae and affords a structure from which a dynamoelectric machine armature can be formed that is capable of being economically wound with energizing coils to substantially fill each of the winding slots therein with such coils.

Another object of the invention is to provide an armature lamina with winding-receiving slots in the periphery thereof such that each of said slots is provided with a winding-receiving mouth positioned off-center relative to the radial axis of the slot.

Yet another object of the invention is to provide an armature lamina having peripheral slots each of which are defined by adjacent neck portions formed on the lamina and all except one of these neck portions is provided with a lip that extends more than halfway across the outer end of an adjacent slot.

Still another object of the invention is to provide an armature lamina that can be economically wound with a short pitch winding that substantially fills each of the winding slots in the lamina with turns of an energizing winding.

A further object of the invention is to provide armature laminae that can be readily wound with a double fly winding machine that substantially fills each of the winding slots in the laminae with turns of an energizing winding.

Additional objects and advantages of the invention will be apparent from the description of it that follows considered in conjunction with the accompanying drawings.

SUMMARY OF THE INVENTION

In one preferred embodiment of the invention a lamina for an armature of a random wound dynamoelectric machine is formed with a plurality of winding-receiving slots spaced around its periphery. Each of said slots are characterized by having its axially extending mouth positioned closely adjacent one side of the slot so that each slot can be completely filled with energizing windings with the last winding turn in each slot disposed next to the slot mouth.

DESCRIPTION OF THE PREFERRED EMBODIMENTS

Figure 1:
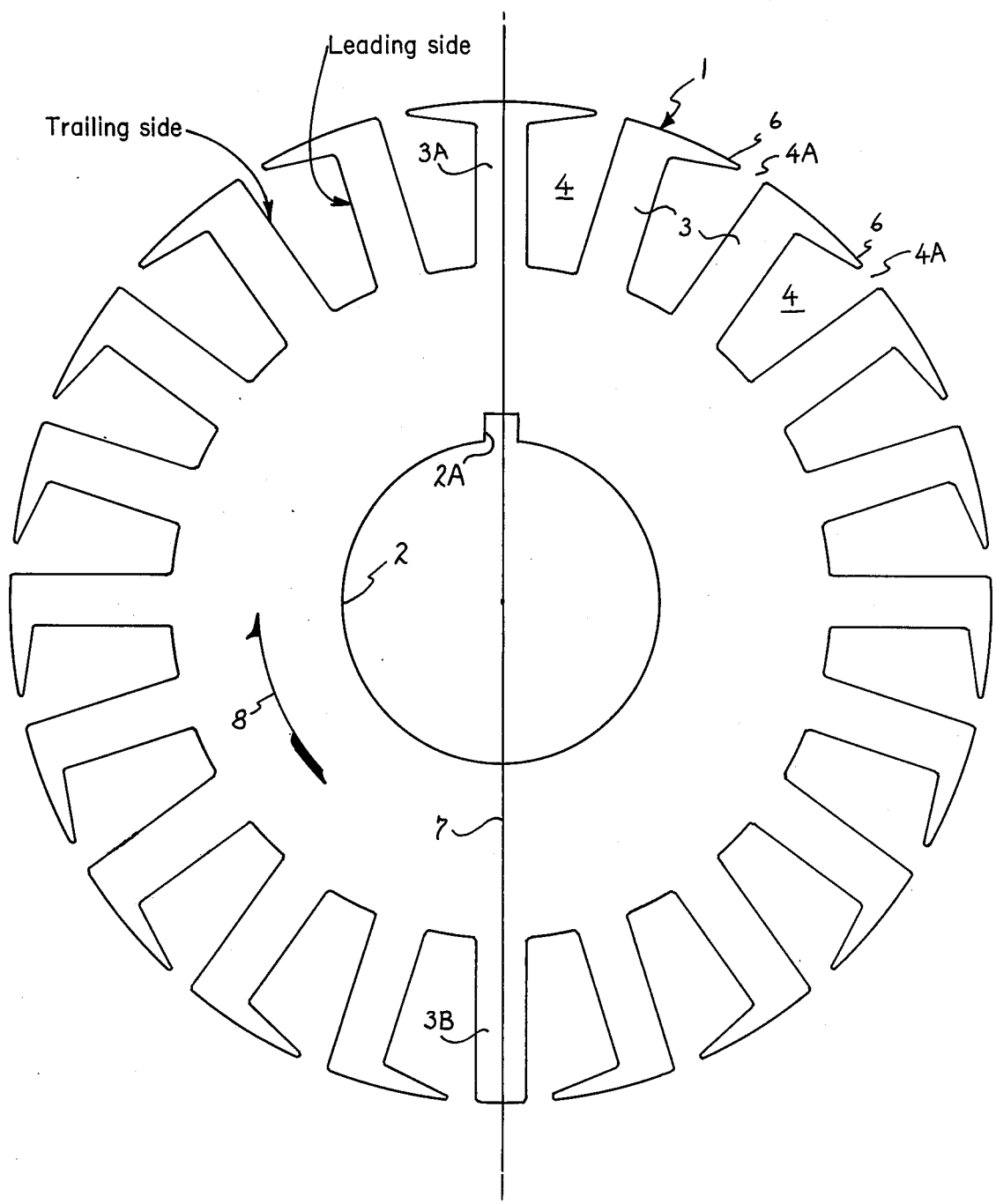
FIG. 1 is a plan view of an armature lamina constructed pursuant to the invention.

Referring first to FIG. 1 it will be seen that there is shown a formed lamina for a dynamoelectric machine armature. As is generally well-known, such a lamina is typically formed by punching a sheet of magnetic iron to define a central bore 2 with a keyway 2A and a plurality of neck portions 3, the opposite sides of which define radially extending sides of winding-receiving slots four. Normally a plurality of such laminations 1 are stacked on a suitable spindle or axle (not shown in FIG. 1) to form a dynamoelectric machine armature core, such as the armature 5 illustrated in FIG. 2. In such an assembly the individual laminae 1 are insulated from one another by any suitable means such as by either applying a suitable shellac or other conventional insulating resin to them, or by annealing uncoated stock to form an oxide layer that affords adequate inter-lamina insulation. Such assembly processes and insulating techniques are generally well known and will not be further described herein since a detailed knowledge of them is not necessary to enable an understanding of the present invention.

The lamina 1 shown in FIG. 1 is further characterized according to the present invention by having each of the respective winding slots 4 include an improvement comprising a lip 6 formed on a pre-determined side of each slot in a manner such that the lip extends about halfway, or more, across the width of the slot beneath it. The purpose of this major extension of the lips 6 is to allow more wire to be contained in the slots before the opening is blocked and to hold the windings in place. With this novel construction, the respective lips define gaps 4A, or mouths, for the respective associated winding slots 4. Each of the axially extended slot mouths 4A is defined by one of the lips 6 and the opposite radially extending side of the winding slot toward which the lip protrudes.

A first group of the lips 6 are shown to the left of the vertical diameter line 7 in FIG. 1. This first group of lips is formed on the respective leading sides of the winding slots 4, assuming the lamina 1 is designed for rotation in the direction of the arrow 8 shown thereon. A second group of lips 6 is those shown in FIG. 1 to the right of the diameter line 7 and the lips in this second group are formed, respectively, on the trailing sides of the winding slots 4 closest thereto, still assuming the same direction of rotation for the lamina.

The purpose of arranging the lips 6 on the respective neck portions 3 of the lamina 1 will be more fully described hereinafter with reference to FIG. 3. However, at this point, it will help complete the description of the preferred embodiment of the invention shown in FIG. 1 to not that all of the neck portions 3, except for two differently shaped neck portions 3A and 3B, are formed with a lip 6 extending from one side thereof. This arrangement results in one of the two differently shaped neck portions 3A being provided with two lips 6, which extend, respectively, from opposite sides thereof, as shown at the top of FIG. 1. The other of the two differently shaped neck portions 3B is formed with essentially radially straight sides, i.e., without any lips being defined thereon.

Figure 3:
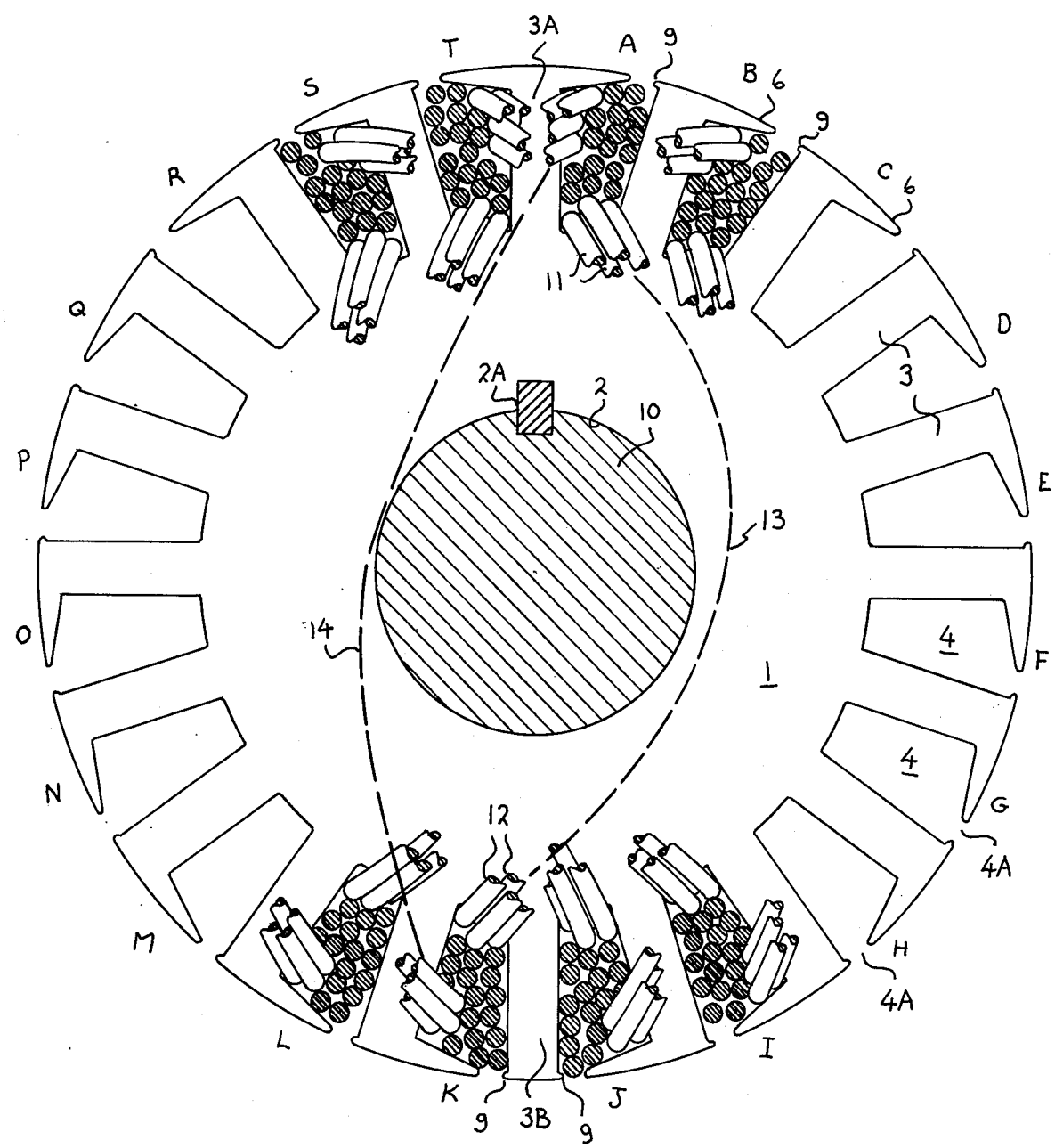
FIG. 3 is a plan view of one end of an armature stack similar to that shown in FIG. 2, illustrated with respect to fragments of energizing winding coils, some of which are shown in cross-section, and part of the windings are depicted as they would be positioned respectively in the winding-receiving slots of the armature, to illustrate the advantages of the invention.

Before reference is made to FIG. 3 of the drawings to further explain the advantages of the invention and describe an alternative configuration, it should be appreciated that in the preferred embodiment illustrated in FIG. 1 each of the winding slots 4 is substantially identical in form except for the relative orientation the respective mouths, or winding-receiving gaps, on either the leading or trailing side thereof, as described above. Also, each of the winding slots is generally identical in cross-sectional area and shape, except for the aforementioned orientation of the mouths of the slots for the two different groupings thereof described above.

Referring now to FIG. 3 of the drawings, there is shown a lamina that is similar in many respects to the lamina 1 illustrated in FIG. 1. Accordingly, like identifying numbers are used to designate equivalent parts thereof. Thus, a bore 2 is provided through the lamina 1 and a plurality of winding-receiving slots 4 are defined by radially extending neck portions 3. The primary difference between the lamina 1 shown in FIG. 3 and the embodiment of the invention shown in FIG. 1 is that a small projection 9 is provided on each of the neck portions, except for neck portion 3A, near the peripheral edge thereof on the side opposite to the associated lip 6 mounted on the neck portion. Thus, each small projection 9 is positioned to cooperate with the outer end of an adjacent lip 6, thereby to define an axially extending gap or mouth for the winding slot over which the associated lip 6 extends. As clearly seen in FIG. 3, one of the differently shaped neck portions 3A having two lips thereon is not provided with any small projecting portions such as the portions designated 9 on the other necks 3. On the other hand, the other differently shaped neck portion 3B is provided with two of the small projections 9 that extend respectively from opposite sides thereof. Also according to this alternative form of the invention, each of the small projecting portions 9 is made less than 25 percent as long as one of the lips 6 thereby to assure that the respective winding-receiving mouths of the winding slots are positioned substantially off-center, i.e., to one side of the slot.

The primary purpose of the small projections 9, in this form of the invention, is to provide a suitable retaining means for a conventional winding topstick or wedge (not shown), if the use of such a wedge is deemed necessary in a given application. Thus, it will be appreciated that a similar wedge-retaining function could be afforded by forming dovetail-type slots in the respective necks 3 and 3B, in lieu of the small projections 9.

Figure 2:
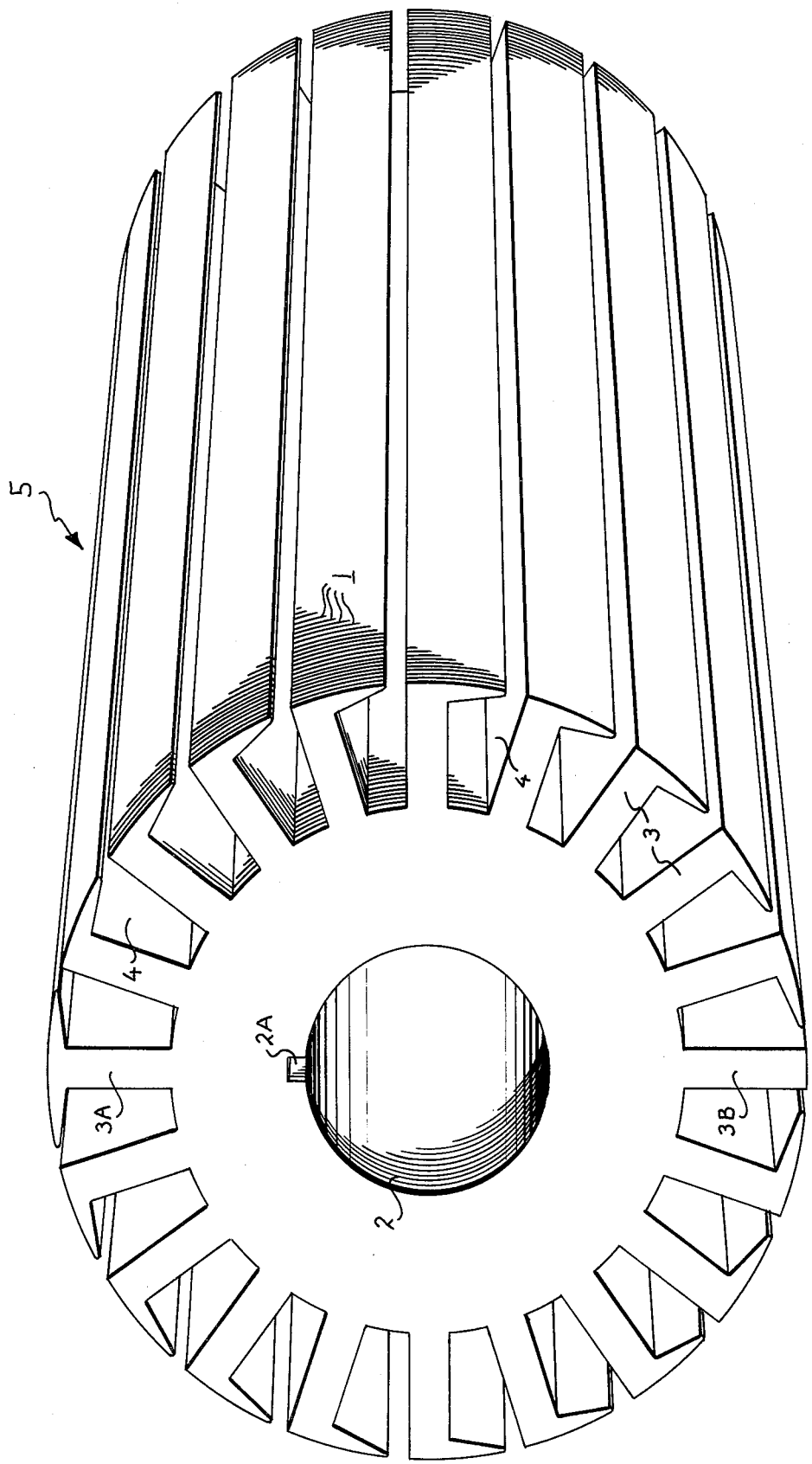
FIG. 2 is a perspective view of a plurality of laminae, each like the one shown in FIG. 1, stacked to form a dynamoelectric machine armature that is suitable for mounting on a conventional spindle and for receiving energizing windings in the slots thereof.

Now that the general construction of the preferred embodiments of the invention described above have been explained, the operation and advantages of the invention will be discussed with reference to FIGS. 1, 2 and 3. Assuming that a plurality of laminae, such as the lamina 1 shown in either FIGS. 1 or 3, have been stacked to define an armature assembly in the manner illustrated in FIG. 2, and mounted on a suitable axle 10 the end of which is shown in FIG. 3, the armature would be ready to receive a plurality of conductive winding coils in its winding slots.

In order to briefly explain a typical winding procedure for applying a random winding to such an armature assembly, the respective winding slots 4 illustrated in FIG. 3 have been identified by the letters A through T, shown outwardly from the slots. An initial set of winding coils, fragments of which are shown as the coil ends 11 and 12, is wound so that the axially extending portions of these coils will be disposed respectively in the winding slots A and K. Normally, winding of the armature will proceed by positioning all of the turns in this first set of winding coils to one side of the axle 10, as generally designated by the dashed line 13. Further winding of the armature will subsequently proceed by positioning a successive set of winding coils in the next pair of winding slots B and L, followed by placing another set of coils in the next pair of winding slots C and M, etc. continuing in this manner around the armature until the pair of slots J and T are reached, thereby placing a set of windings in the radially lower half of each of the slots. Due to the winding pattern in which each of the sets of winding coils in this first group is passed to the same side of the axle 10, it will be noted that the axially extending sides of the first group of coils lie primarily in the lower halves of the winding slots, with the coils being initially built up from the respective sides of the slots closest to the side of the axle 10 around which the radially extending sides of the coils are passed.

Now as a second group of energizing coils is positioned in the respective slots, again starting with the pair of winding slots A and K, the coil turns in this group will be passed to the opposite side of the axle 10, as indicated by the dashed line 14. Moreover, since the second group of windings will overlay the first group of windings, the respective axially extending sides of the individual turns in this second group of windings will lay primarily in the radially outer halves of the respective winding slots, with the winding turns built up from the sides of the slots closest to the side of the axle 10 around which the radially extending sides of the windings are placed. Again, the winding proceeds with the next set of windings being positioned in the pair of winding slots B and L, and the armature is wound in this fashion until the final pair of slots J and T are filled.

It is important to note that due to the novel provision of the respective lips 6 and the resultant location of the mouths of the winding slots 4 being positioned to the predetermined sides of the slots indicated above, the last turn of each winding coil placed in the respective slots will be immediately adjacent to the slot mouth and will result in the slot being substantially filled with winding turns. Such filling of these slots is possible because as the second group of energizing windings is applied, they are pulled tightly to the side of the slot closest to the side of the axle 10 around which the radially extending sides of these windings are positioned, thus, the winding turns fill the slot steadily toward its mouth and the last turn of the respective windings can only block the mouth after the slot is substantially filled with the preceding turns of the windings. Accordingly, the primary objective of the present invention is realized because optimum utilization of the winding slots is achieved.

Figure 4:
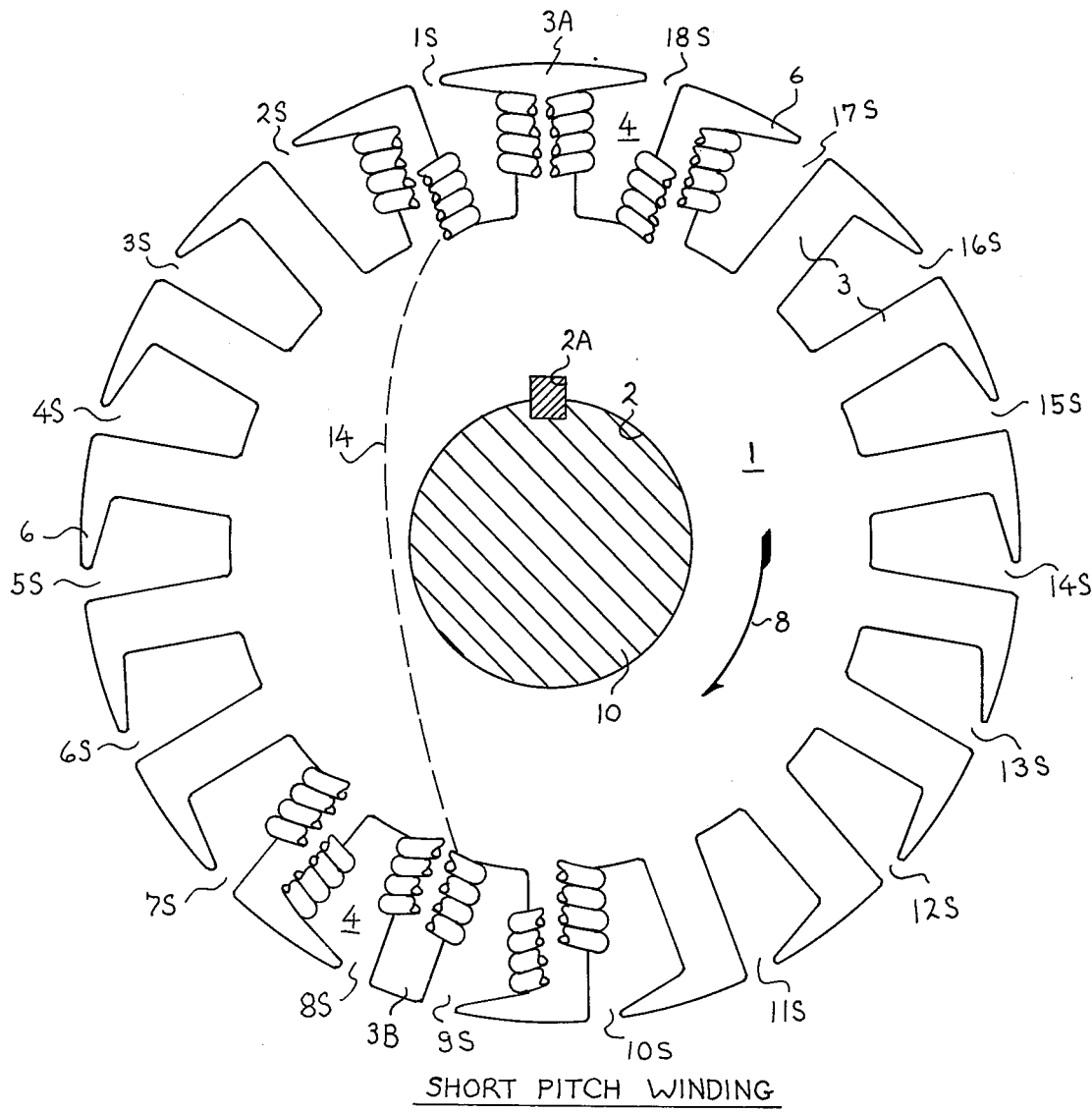
FIG. 4 is a plan view of one end of an alternative embodiment of the invention in which an armature stack is formed with laminae that are suitable for having a short pitch winding applied thereto, in the pattern set forth by the chart also included in FIG. 4, thereby to completely fill each slot with winding turns in accordance with the invention.

Now that the basic principle of the inventions has been explained with reference to the embodiments depicted in FIGS. 1-3, two further alternative forms of the invention will be described in order to fully explain how the invention can be practiced to make either an armature having a short pitch winding or an armature having a winding that can be applied with a double fly winder. Since both of these winding techniques is generally familiar to those skilled in the art, they will be described only briefly in order to demonstrate suitable lamina constructions to afford the desired objectives of the present invention when such techniques are employed. Referring first to FIG. 4, there is shown the side of an end lamina 1 having a bore 2 formed therein and a plurality of winding-receiving slots 4 defined by radially extending neck portions 3. The basic difference between the lamina 1 shown in FIG. 4 and that shown in FIG. 1 is that the neck portions 3A and 3B in the FIG. 4 embodiment are not diametrically opposed and two more of the neck portions 3 are provided in a first group with lips 6 on their respective leading sides (assuming rotation as shown by arrow 8), than the number of neck portions 3, provided in a second group, having lips 6 on their respective trailing sides. This arrangement enables a short pitch winding to be applied in the sequence indicated in the chart shown in FIG. 4, with a first set of coils being wound in slots 1S-9S, which are one slot short of being diametrically opposed. The winding then progresses with the next set of coils being positioned in slots 2S-10S, etc. until each of the slots is completely filled with winding turns according to the invention. The advantage of short pitch windings in terms of material utilization and end turn extensions are not critical to the present invention so no further explanation of the embodiment of the invention shown in FIG. 4 is believed to be needed to enable those skilled in the art to use the invention in making an armature with a short pitch winding.

Figure 5:
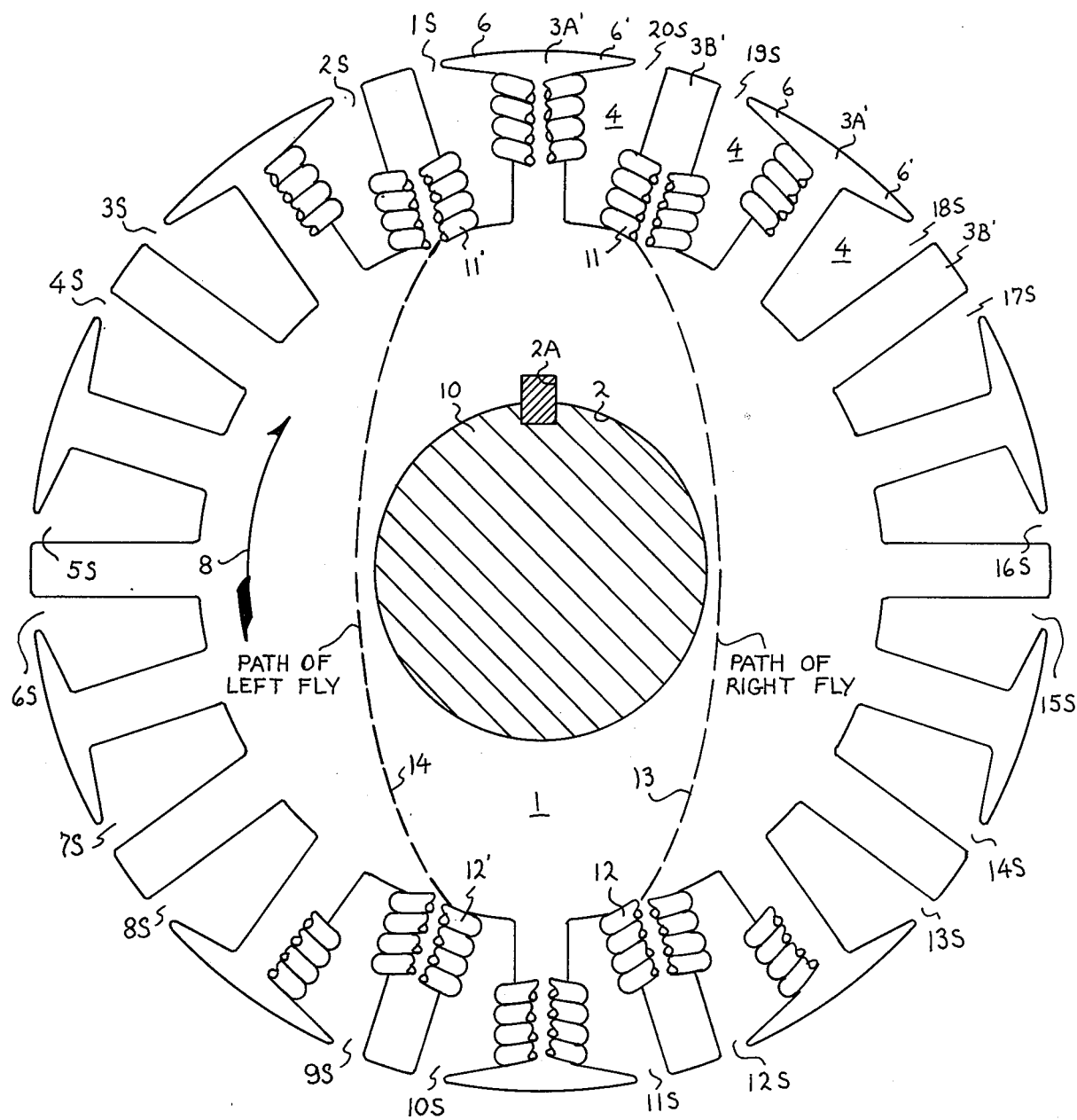
FIG. 5 is a plan view of one end of another alternative embodiment of the invention illustrating an armature stack formed with laminae that are suitable for being wound with a double fly winding machine to completely fill each slot with winding turns pursuant to the invention.

An embodiment of the invention that is useful in making an armature with a double fly winder is shown in FIG. 5 in conjunction with a chart that lists a suitable winding sequence. Again, like numbers are used to designate components similar to those illustrated in the other figures of the drawing. Thus, a lamina 1 is shown having a bore 2 and keyway 2A formed therein. A plurality of such laminae are mounted on an axle 10 and a plurality of neck portions 3A' and 3B' are formed around the periphery to define winding receiving slots 4. To briefly explain the use of this form of the invention end portions of winding turns 11-12 and 11'-12' are shown and dashed lines 13 and 14 are used in FIG. 5 to depict two paths for these respective sets of coils that can be simultaneously wound on the laminae 1 with a double fly winding machine. As indicated in winding sequence chart shown in FIG. 5, one fly (called the left fly here) will wind the turns 11'-12' in the slots 1S-10S while simultaneously the other fly (the right fly of the winding machine) will wind the turns 11-12 in slots 11S-20S. Subsequently the remaining slots will be wound in the sequence shown in the chart until the slots are filled according to the practice of the invention. To enable the last turns of each set of coils to substantially fill the slots, each lamina 1 is formed to provide a pair of lips 6-6' on opposite sides of alternate neck portions 3A' which are shown spaced around the periphery of the laminae. The remaining neck portions 3B' spaced around the periphery of the laminae are each provided with substantially straight radially extending sides. Of course, if it is desired to modify these substantially straight sides of neck portions 3B' to provide wedge retaining means, such as the small projections 9 shown in FIG. 3, or wedge retaining slots, such modifications can be made without unduly impairing the usefulness of this embodiment of the invention. Also, it will be appreciated that in still other embodiments of the invention, a similar pattern of alternate, double-lipped neck portion 3A' and substantially straight sided neck portions 3B' may be used to form laminae with a greater or lesses number of winding slots. In this regard it is only necessary to recognize the number of winding slots used must be evenly divisible by four to enable double fly winding.

The use of a lamina 1 of the invention to form an armature of one of the types described above will be readily understood from the foregoing description; accordingly, no further description of the operation of the invention is believed to be necessary to assure a complete understanding of it. Moreover, those skilled in the art will recognize that further modifications and improvements may be made in the invention without departing from its scope. For example, where the embodiments of the invention described above have been said to employ equally spaced winding slots of essentially identical cross-section, it will be apparent that minor changes can be made in such dimensions within the scope of the invention. Accordingly, it is my intention to encompass within the following claims the true spirit and scope of the invention.

What I claim as new and desire to secure by Letters Patent of the United States is:

1. An armature lamina for a dynamoelectric machine comprising an insulated, generally flat sheet of magnetic iron formed to have a central bore for receiving an axle, and further formed to have a plurality of slots in its periphery for receiving insulated electrical windings and including the improvement comprising a plurality of lips each formed on a predetermined side of a respective neck portion defining each winding slot of the lamina to extend at least about halfway across the mouth of said slot and define a gap with another neck portion on the opposite side of the slot, each lip in a first group of said lips being formed on the leading side of a slot closest thereto, and each lip in a second group of said lips being formed on the trailing side of a neck portion defining one side of a respective slot closest thereto.

2. A lamina as defined in claim 1 wherein said first group comprises half of said lips and said second group comprises the other half of said lips.

3. A lamina as defined in claim 2 wherein said lips in said first half are positioned on one side of a diameter of the lamina while the lips in said other half are positioned on the other side of said diameter.

4. A lamina as defined in claim 3 wherein said slots are equally spaced around the periphery of the lamina.

5. A lamina as defined in claim 1 wherein the radially extending side walls of each of said slots are formed respectively by one side of a neck portion of the lamina extending between adjacent slots, all of said neck portions except two differently shaped neck portions being formed respectively with one of said lips extending from a side thereof, one of said two different shaped neck portions being provided with two of said lips respectively extending from opposite sides thereof, the other of said two differently shaped neck portions being formed without any of said lips thereon.

6. A lamina as defined in claim 5 wherein all of said neck portions except said two differently shaped neck portions are provided with a small projection near the peripheral edge on the side thereof opposite to the lip extending therefrom, each said small projection being positioned to cooperate with the outer end of an adjacent lip to define an axially extending gap there between, one of said two differently formed neck portions being formed without any of said small projections, and the other of said two differently shaped neck portions being provided with two of said small projections extending respectively from opposite sides of the radially outer end thereof, each of said small projecting portions being less than 25 percent as long as one of said lips.

7. A lamina as defined in claim 1 wherein said first group includes two more of said lips than are in the second group.

8. A lamina as defined in claim 5 wherein said two differently shaped neck portions are positioned between the neck portions having said first and second groups of lips thereon, said differently shaped neck portions being positioned one slot short of diagonally opposed to one another.

9. An armature lamina for a dynamoelectric machine comprising a generally flat sheet of magnetic iron formed to have a central bore for receiving an axle and further formed to have a plurality of slots in its periphery for receiving insulated electrical windings when a plurality of similar laminae are stacked with their respective winding-receiving slots in alignment to define an armature, including the improvement comprising a pair of lips formed respectively on opposite sides of alternate neck portions spaced around the periphery of said lamina between the winding slots, each of said lips being arranged to extend at least part way across the mouth of the slot closest thereto, the remaining neck portions spaced around the periphery of the laminae being provided with straight substantially radially extending sides that define, respective sides of said winding slots.

10. A lamina as defined in claim 9 wherein the number of slots defined by the sides of all the neck portions thereon is evenly divided by four.

11. An armature lamina for a dynamoelectric machine comprising a generally flat magnetic member formed with a plurality of slots spaced around its periphery for receiving electrical windings, including the improvement comprising a plurality of neck portions each extending, respectively, between two of said slots to define walls thereof, a first predetermined number of said neck portions being formed with at least one lip protruding from at least one side thereof to define a winding-receiving gap with the side of a neck portion on the opposite side of the slot adjacent thereto, at least one but not all of said predetermined number of neck portions being formed with two lips, respectively protruding from opposite side thereof, the remainder of said neck portions each being formed without a lip extending from either side thereof, whereby each of said winding-receiving gaps are positioned substantially off-center relative to the radial center axis of the winding slot associated therewith.

12. A lamina as define in claim 10 wherein only one of said neck portions is formed with two lips, and only one of said neck portions is formed without a lip.

13. A lamina as defined in claim 12 wherein said neck portion having two lips is diametrically opposed on the lamina to the neck portion without a lip.

14. A lamina as defined in claim 12 wherein said neck portion having two lips is one slot less than diametrically opposite to the neck portion without a lip.

15. A lamina as defined in claim 11 wherein half of the neck portions on said lamina are formed with two lips, the remainder of said neck portion being formed without a lip, each of said neck portions having lips being positioned, respectively, between two neck portions without a lip thereon.

16. A lamina as define in claim 15 wherein the number of winding slots defined by said neck portions is evenly divisible by four.

* * * * *